United States Patent [19]

Godwin

[11] Patent Number: 4,943,907
[45] Date of Patent: Jul. 24, 1990

[54] SPEED CONTROLLER FOR RECORDING AND PLAYBACK APPARATUS

[75] Inventor: Kurt E. Godwin, Loveland, Colo.

[73] Assignee: Colorado Memory Systems, Inc., Loveland, Colo.

[21] Appl. No.: 48,022

[22] Filed: May 8, 1987

[51] Int. Cl.⁵ .............................................. G06F 1/00
[52] U.S. Cl. .................. 364/200; 364/238.4; 364/248.1; 364/270.6
[58] Field of Search ... 364/200 MS File, 900 MS File

[56] References Cited

U.S. PATENT DOCUMENTS

| | | | |
|---|---|---|---|
| 3,987,419 | 10/1976 | Morrill et al. | 364/200 |
| 3,999,163 | 12/1976 | Levy et al. | 364/200 |
| 4,007,449 | 2/1977 | Vercesi | 364/200 |
| 4,034,352 | 7/1977 | Hotchkiss | 364/900 |
| 4,110,823 | 8/1978 | Cronshaw et al. | 364/200 |
| 4,159,517 | 6/1979 | Paradine et al. | 364/200 |
| 4,210,959 | 7/1980 | Wozniak | 364/200 |
| 4,314,291 | 2/1982 | Oda et al. | 360/78 |
| 4,443,883 | 4/1984 | Berger | 364/900 |
| 4,494,196 | 1/1985 | Greer | 364/200 |
| 4,500,957 | 2/1985 | Hanamoto et al. | 364/900 |
| 4,527,236 | 7/1985 | Ermolovich | 364/200 |
| 4,591,933 | 5/1986 | Quackenbush | 360/78 |

*Primary Examiner*—Gareth D. Shaw
*Assistant Examiner*—Rebecca L. Rudolph
*Attorney, Agent, or Firm*—Dorr, Carson, Sloan & Peterson

[57] ABSTRACT

Apparatus for controlling the operational speed of a peripheral multispeed record/playback device so that the device and a connected computer can communicate at a compatible data rate. When a speed control operation is initiated, the device generates index pulses at a rapid rate. The computer generates a series of n test pulses in response to the generation of the first index pulse. The computer then times how long the n test pulses take to be generated. The peripheral device is then told to run at the data rate represented by how long it took to generate the n test pulses.

28 Claims, 11 Drawing Sheets

Fig. 5 DRIVE 105

FLOPPY CONTROLLER 103

COMPUTER 101

FLOPPY CONTROLLER 103

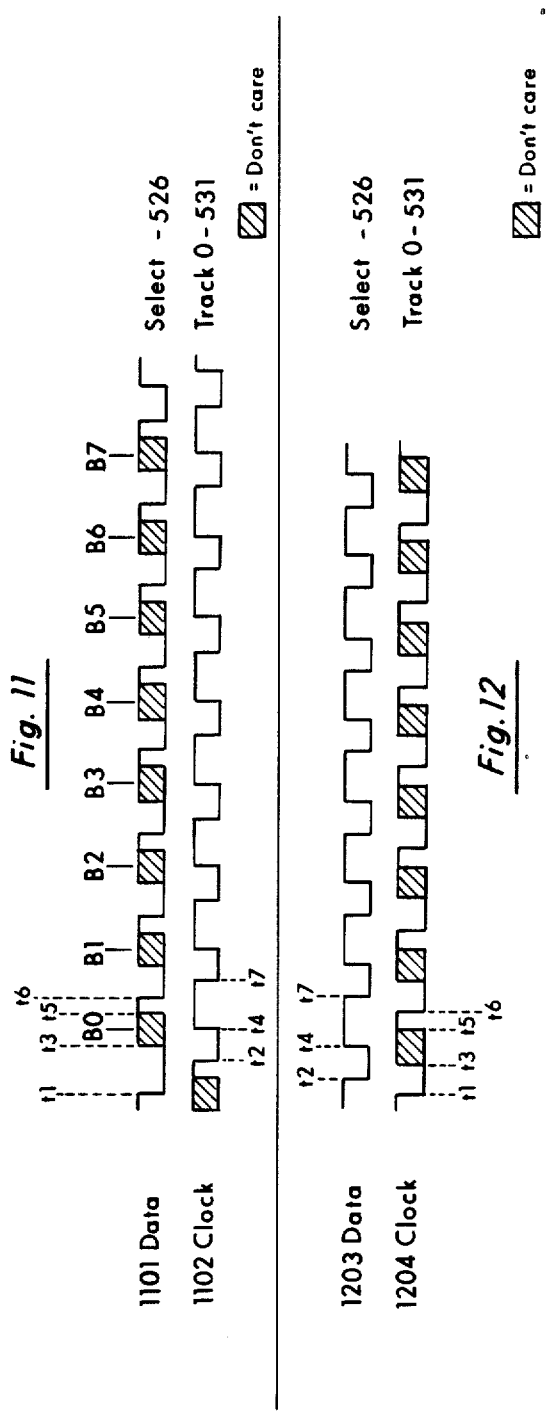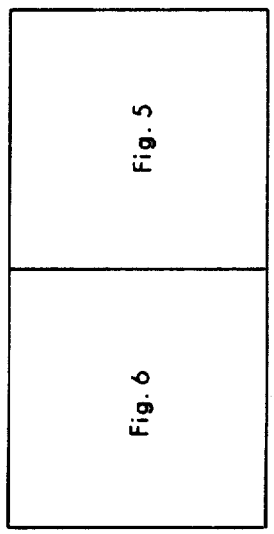

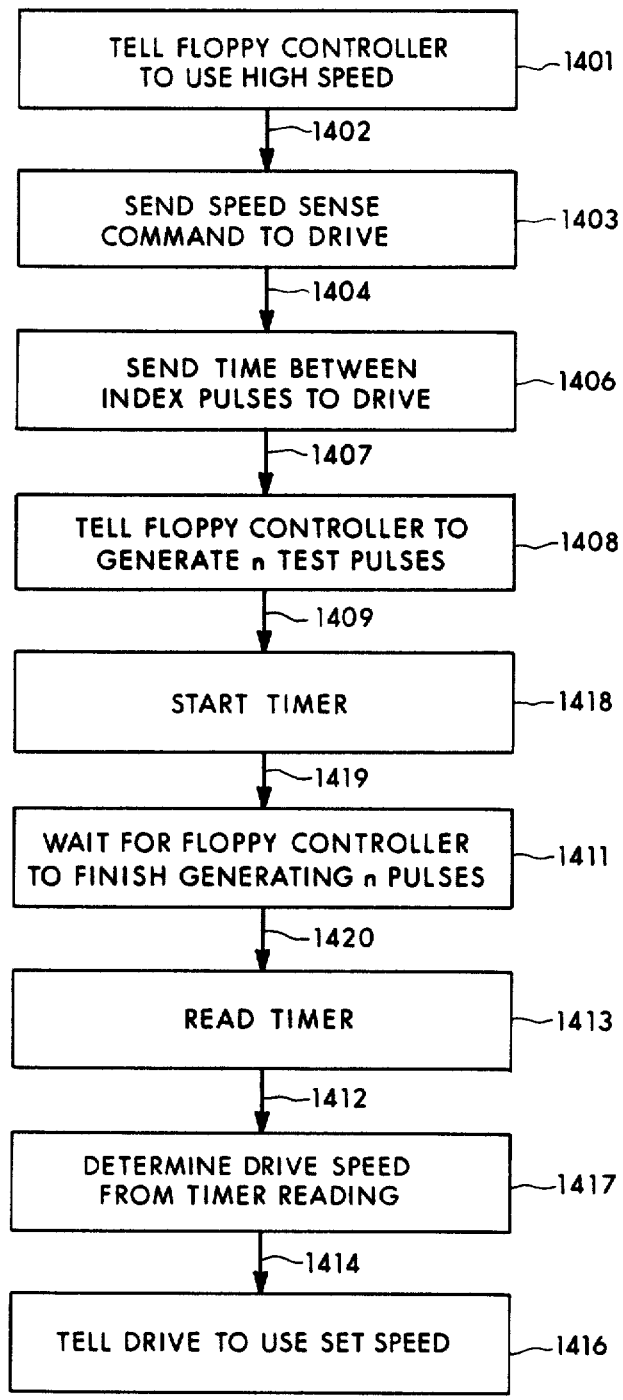

FLOPPY CONTROLLER
103

SPEED CONTROLLER FOR RECORDING AND PLAYBACK APPARATUS

FIELD OF THE INVENTION

This invention relates to an arrangement for controlling the operating speed of peripheral recording and playback apparatus. In particular, the invention relates to facilities for controlling the operating speed of peripheral disk or tape drive equipment to which a computer is connected and with which the computer is to exchange data.

BACKGROUND OF THE INVENTION

Continuing advances are being made in the field of computers and related peripheral equipment. These advances often include an increased speed of operation and/or an increase in the rate at which data can be exchanged between connected devices. Users do not immediately discard their existing equipment when improved equipment becomes available. Instead, they often prefer to recoup their investment and use their existing equipment for the duration of its useful life. As a result, a system is often upgraded and replaced piece-by-piece as each item nears the end of its useful life.

Generally, newer equipment can operate at a higher speed or data rate than can older equipment. When a data processing system user updates his system, it is important that the higher data rates of the newly acquired equipment be utilized where possible. It is also desirable that the data rate of the new equipment be controllable to provide backward compatibility with older system elements that have lower data rates.

The above compatibility requirements are particularly desirable with respect to a computer and its peripherals such as disk drives and tape drives. A computer is typically equipped with a control board, termed a floppy controller, which permits the computer to communicate with the disk or tape drive (hereinafter drive). A system user may replace a controller or an existing low speed drive with a newer drive capable of operating at a plurality of speeds including speeds that are higher than that of the drive being replaced. It is necessary when such a replacement is made that the new controller or drive be advised as to the speed at which it should operate so that both the drive and the controller operate at the maximum possible data rate common to both devices. Speed compatibility is desirable so that a drive can record data at different rates and so that a tape written at a high data rate by one drive can be read by another drive operating at a lower data rate.

It is heretofore been difficult to achieve this maximum common data rate since it required the computer user to perform manual operations as well as to have knowledge of the capabilities of both the floppy controller and the new disk drive. The manual operations were required so that appropriate control signals could be transmitted under user control to the drive instructing it to operate at the highest data rate common to both the floppy controller and the drive. Also, knowledge of the data rate capabilities of these devices is often not readily available. Even if available, it can often only be obtained by pursuing the operational manuals for the connected devices. It may therefore be seen that it is a problem in data processing systems to cause a new newly installed drive to operate with its connected floppy interface at the highest data rate common to both devices.

SUMMARY OF THE INVENTION

The present invention solves the above discussed problem and achieves a technical advance by providing a speed control arrangement for a computer's floppy controller and a peripheral drive having a plurality of operating speeds. The provided facilities cause the two devices automatically to operate at the highest data rate common to both. This speed control adjustment is performed automatically without any user knowledge or action being required.

The provided arrangement includes apparatus in the drive for generating index pulses at a plurality of different rates with each rate being associated with one of the operational speeds of the drive. The invention also uses test pulse generation circuitry in the floppy controller which generates a series of n test pulses and which determines whether or not the duration of the n test pulse series exceeds the time interval between two successive index pulses generated by the drive. Circuitry in the floppy controller receives both the series of n test pulses and the index pulses, compares the duration of time for both and determines whether or not the floppy controller is capable of operating at the data rate associated with the index pulses generated by the drive. If a determination is made that the drive and the controller are compatible at the speed represented by the index pulses, both devices are commanded to operate at this speed. On the other hand, if a determination is made that the two are not compatible, then the drive lowers its speed until it sends out index pulses at a lower rate that is compatible with the rate at which the controller can operate.

More specifically, each time the system is used, the index pulse generating circuitry of the drive generates and transmits to the floppy controller a series of index pulses representing the highest speed at which the drive can operate. The floppy controller receives the first index pulse and then generates a series of n test pulses having a duration of time for the series that is dependent upon the highest data rate at which the controller is capable of operating. A high speed controller generates the burst of n pulses in a time duration shorter than that required for a low speed controller. This series of n pulses is applied to comparison circuitry that also receives the index pulses generated by the drive. This comparison circuitry determines whether the second index pulse is received from the drive after the generation of the nth test pulse or, alternatively, whether the series of n test pulses is still being generated when the second index pulse is received. The series of n test pulses represents a duration of time that must be less than the interval of time between two successive index pulses from the drive if the floppy controller and the drive are operating at a compatible data rate. A series of n test pulses simulates the amount of data that can be recorded on the magnetic medium of the drive in an area defined by the two successive index pulses.

If the n test pulses terminate before the reception of the second index pulse, this indicates that the two devices are operating at a compatible data rate and a signal is then transmitted to the drive to cause it to operate at the speed associated with this data rate. If the comparison circuitry receives the second index pulse from the drive before the nth test pulse is generated, the comparison circuitry determines that the drive is operating at a data rate that is higher than that at which the floppy controller is capable. This information is sent to the drive which sends out a new series of index pulses at a lower rate commensurate with a lower speed of the drive. A new series of test pulses is generated by the floppy controller when the first index pulse of the new series is generated by the drive and the comparison device once again determines whether or not the second index pulse of the new series is received during or after n test pulses are generated by the controller. If the nth test pulse is generated by the controller before the reception of the second index pulse from the drive, the controller and the drive are operating at a compatible rate and a signal is sent to the drive to cause it to continue to operate at a speed associated with this data rate.

On the other hand, if the second index pulse of the new series is received prior to the generation of the nth test pulse, the comparison device determines that the drive is still operating at a speed higher than that at which the controller is capable. The drive then generates index pulses at a still slower rate and transmits them back to the floppy controller. The floppy controller causes a new series of test pulses to be generated so that the comparison device can determine the relative time at which second index pulse and the nth test pulse are received. The operation continues in this manner until a series of index pulses is received having a time duration between two successive index pulses that exceeds the time duration required for n test pulses to be generated by the floppy controller. When this occurs, the floppy controller and the drive are operating at a compatible data rate and the system then causes these two devices to continue to operate at this data rate. This data rate represents the highest data rate common to both the floppy controller and the drive.

The above speed control operations are performed automatically whenever the system is used without any knowledge or special actions being required by the system user. It may be seen therefore that the present invention overcomes the problems and disadvantages of the priorly available speed compatibility and control arrangements.

DESCRIPTION OF THE DRAWINGS

These and other objects and features and advantages of the invention may be better understood from a reading of the following description of several possible exemplary embodiments taken in conjunction with the drawing in which:

FIGS. 11 and 12 illustrate control pulses exchanged by the drive and the controller,
FIG. 13 illustrates how FIGS. 5 and 6 should be arranged, and
FIGS. 14 and 15 disclose processes embodying an alternative embodiment of the invention.

DETAILED DESCRIPTION

Figure 1:
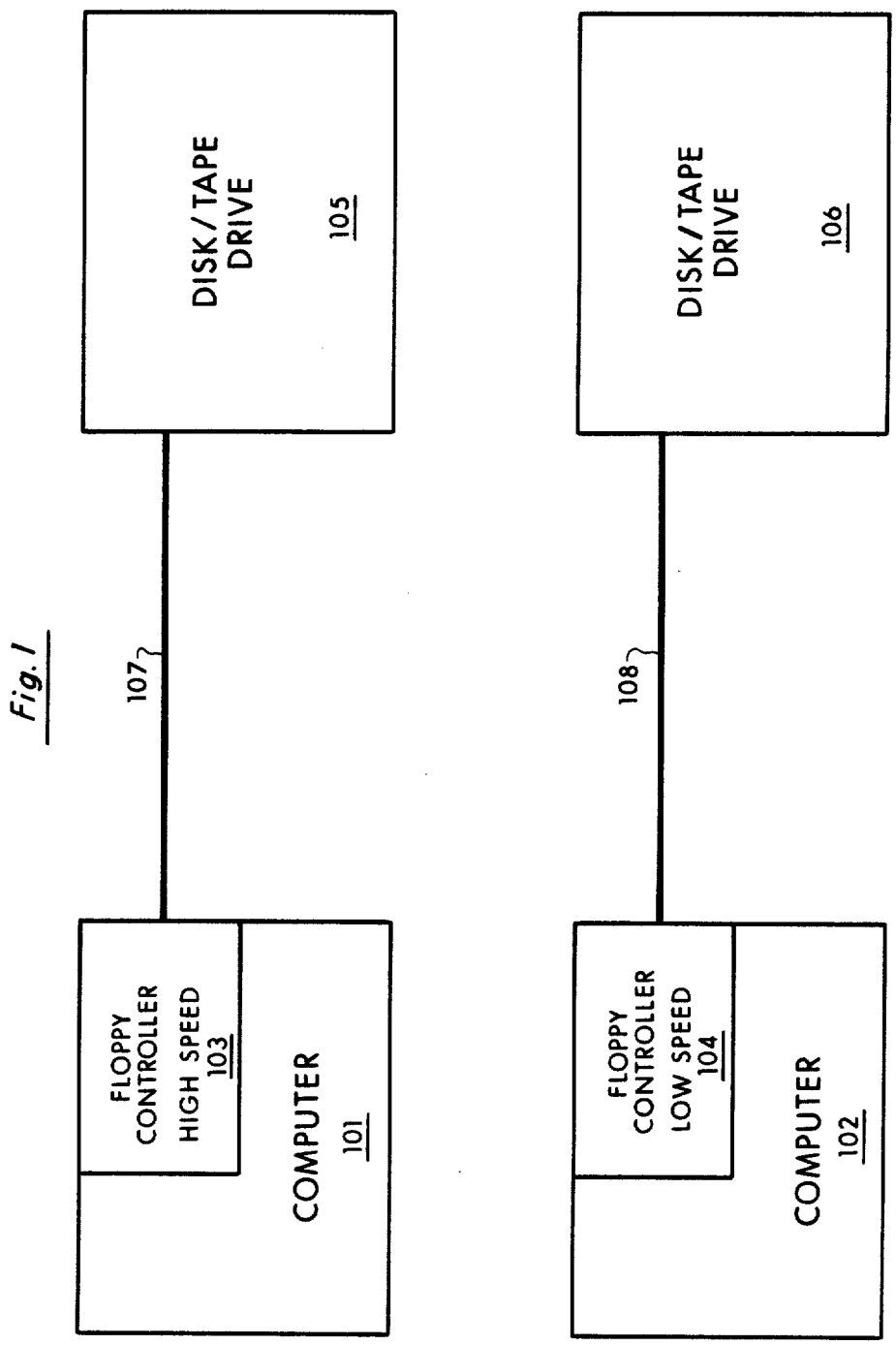
FIG. 1 illustrates a system embodying the invention.

FIG. 1 illustrates a data processing system having computers 101 and 102 together with associated disk or tape drives 105 and 106. Computer 101 is connected to drive 105 by path 107. Computer 102 is connected to drive 106 by path 108. Each computer comprises a floppy controller such as controller 103 for computer 101 and controller 104 for computer 102. Floppy controller 103 is assumed to be capable of operating at a relatively high data rate while floppy controller 104 is assumed to be capable of operating at a lower data rate. Computers 101 and 102 may be IBM PCs or IBM clones. Drives 105 and 106 may either be external drives as shown or they may be drives internal to the associated PCs.

Let it be assumed that drives 105 and 106 are newly acquired devices capable of operating at a plurality of data rates so as to maximize their compatibility with existing equipments. The problem in an installation of this type is that the drive should advantageously be operated at the highest possible data rate that is compatible with the floppy controller to which it is connected. Thus, drive 105 should operate at a relatively high speed to match the capabilities of floppy controller 103. Drive 106 must operate at a lower speed because of the limitations of floppy controller 104. The present invention automatically matches the speed of operation of drives 105 and 106 with the highest data rate at which its associated floppy controller is capable of operating. Thus, the present invention automatically causes drive 105 to operate at a high data rate and drive 106 to operate at a low data rate.

As already mentioned, each time the system is used, a test sequence is initiated in which the drive generates a series of index pulses representing the highest rate at which it can operate. These pulses are transmitted back over paths 107 and 108 to floppy controllers 103 and 104. The floppy controllers generate a series of n test pulses when the first index pulse is received and comparison circuitry in each controller measures the relative time duration of the series of n test pulses with that of the time between two successive index pulses.

Figure 2:
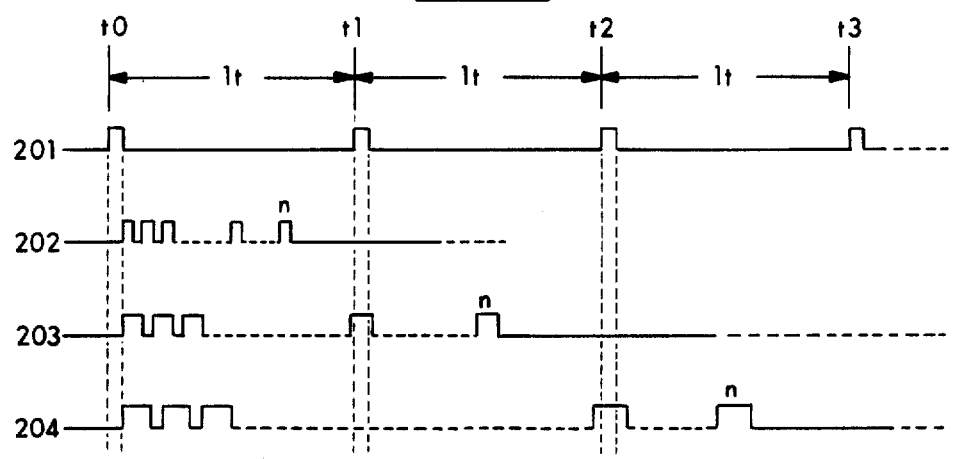
FIGS. 2, 3 and 4 are timing diagrams.

The index pulses generated by the drive and transmitted back to the floppy controller are shown on line 201 of FIG. 2 with an index pulse being generated at each of times t0, t1, t2 and t3. The interval between two successive test pulses is 1t. Lines 202, 203, and 204 portray a series of n test pulses generated by three different floppy controllers having three different speeds of operation. The floppy controller associated with line 202 operates at the highest speed; the controller associated with line 203 operates at an intermediate speed; and the controller associated with line 204 operates at the lowest speed. For line 202 it can be seen that a series of n test pulses is generated by the controller following its reception of the first index pulse from the drive at time t0. It can further be seen that the nth test pulse is generated before time t1 when the second index pulse is received. The time required for a controller to generate a series of n test pulses is related to the data rate of controller and represents the time the controller requires to transmit to and record data on a sector of the medium defined by the two successive index pulses. In other words, if the drive and the controller are operating at a compatible speed, the drive should be able to record the series of test pulses in an area on the disk or tape with the beginning of the sector being indicated by the index pulse at time t0 and terminating with the index pulse generated time t1.

It can be seen with regard to line 202 that the nth test pulse is generated prior to the time that the next index pulse is received time t1. This indicates that the controller associated with line 202 and the drive are operating at a compatible data rate and that the two devices and may exchange data at this compatible rate. It may be seen that the nth test pulse generated by the controller associated with line 203 is not generated until after the second index pulse is received at time t1. This indicates that the controller associated with line 203 cannot operate at the drive speed represented by the index pulses of line 201. The same situation also exists with respect to the controller associated with line 204. The nth test pulse on line 204 is generated long after the index pulse is received at time t1. In summary of FIG. 2 it can be seen that only the floppy controller associated with line 202 is compatible with the data rate of the drive on line 201 and that the controllers associated with lines 203 and 204 are slower and cannot operate at the drive data rate associated with line 201.

Figure 3:
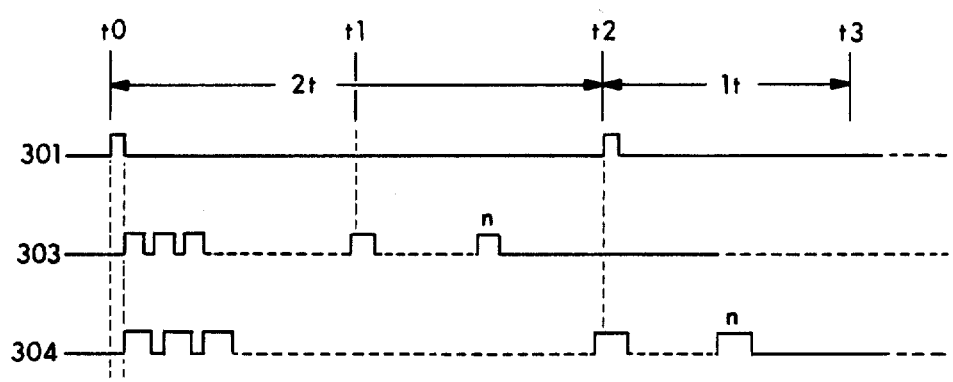

FIG. 3 portrays a timing diagram of a drive that operates at a reduced data rate and that generates index pulses having a time duration of 2t between two successive index pulses. Thus, on line 301, the first index pulse is generated at time t0, the next index pulse is generated at time t2, etc. Line 303 of FIG. 3 is associated with the same floppy controller as line 203 on FIG. 2 and generates a series of n test pulses following the reception of the first index pulse at time t0. The nth test pulse generated on line 303 is generated before the reception of the second index pulse at time t2 on line 301. This indicates that the drive associated with line 301 is operating at a data rate that is compatible with the controller associated with line 303. For line 304, the nth test pulse is not generated prior to the time that the second index pulse is received at time t2. This indicates that the controller associated with line 304 cannot operate at the data rate at which the drive associated with line 301 is currently operating.

Figure 4:
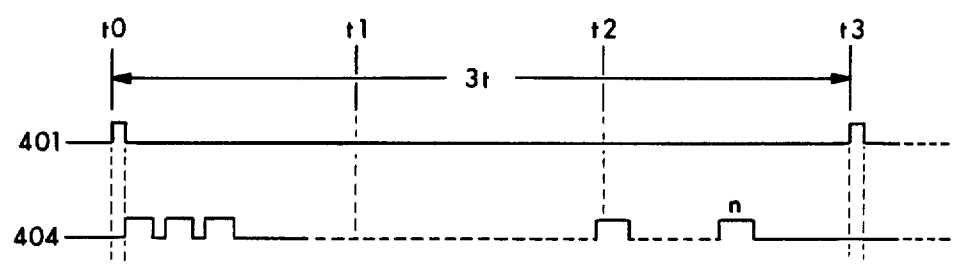

Line 401 of FIG. 4 is the timing diagram for a drive that has reduced its speed of operation to a data rate that is compatible with the relatively slow speed controller associated with line 404. This is the same controller associated with lines 204 and 304. This controller generates a series of n test pulses following the reception of the first index pulse at time t0. The second index pulse is received at time t3 on line 401 and the nth test pulse generated by the floppy controller is received before the generation of the second index pulse at time t3. Therefore, the drive whose operation is portrayed by line 401 is operating at a data rate compatible with the relatively slow speed controller associated with line 404.

FIGS. 2, 3, and 4 taken together, represent a test sequence that determines the speed at which a multi-speed drive should operate in order to be compatible with a floppy controller. That sequence is initiated in FIG. 2 when the drive operates at its highest data rate and generates the index pulses shown on line 201. When the drive operates at this speed, only a floppy controller having the capabilities portrayed on line 202 is compatible at the current speed of the drive. The slower controllers associated with lines 203 and 204 are incompatible.

If the drive associated with line 201 is to operate with the controller of line 202, the test sequence can now be terminated since the drive is operating a speed that is compatible with the controller of line 202. On the other hand, if the drive that is connected to a controller associated with lines 203 or 204, the comparison circuitry of the present invention is effective to determine that the drive speed associated with line 201 is too high and must be reduced to make it compatible with the controllers associated with lines 203 or 204.

The next stage in the test sequence is shown in FIG. 3 where the drive reduces its speed and generates index pulses at one-half the rate it did on FIG. 2. Comparison circuitry again analyzes the series of n test pulses generated by the floppy controller associated with line 303 and determines that the drive is now operating at a data rate that is compatible with the controller associated with line 303. This determination is made since the nth test pulse is generated on line 303 prior to the generation of the second index pulse on line 301 at time t2. If the controller associated with line 303 is connected to the drive of line 301, the test sequence can now be terminated since the drive speed of line 301 is compatible with the data rate of the controller associated with line 303.

On the other hand, if the drive is to operate with the controller associated with line 304, the drive must lower its speed further and generate index pulses at a still lower rate, such as once every 3t, as shown on line 401. When the drive speed is reduced to this extent, the controller associated with line 404 is now compatible with the current drive speed on line 401 since the nth test pulse generated by the controller is generated prior to the reception of the second index pulse at time t3.

DESCRIPTION OF FIG. 5

Figure 5:
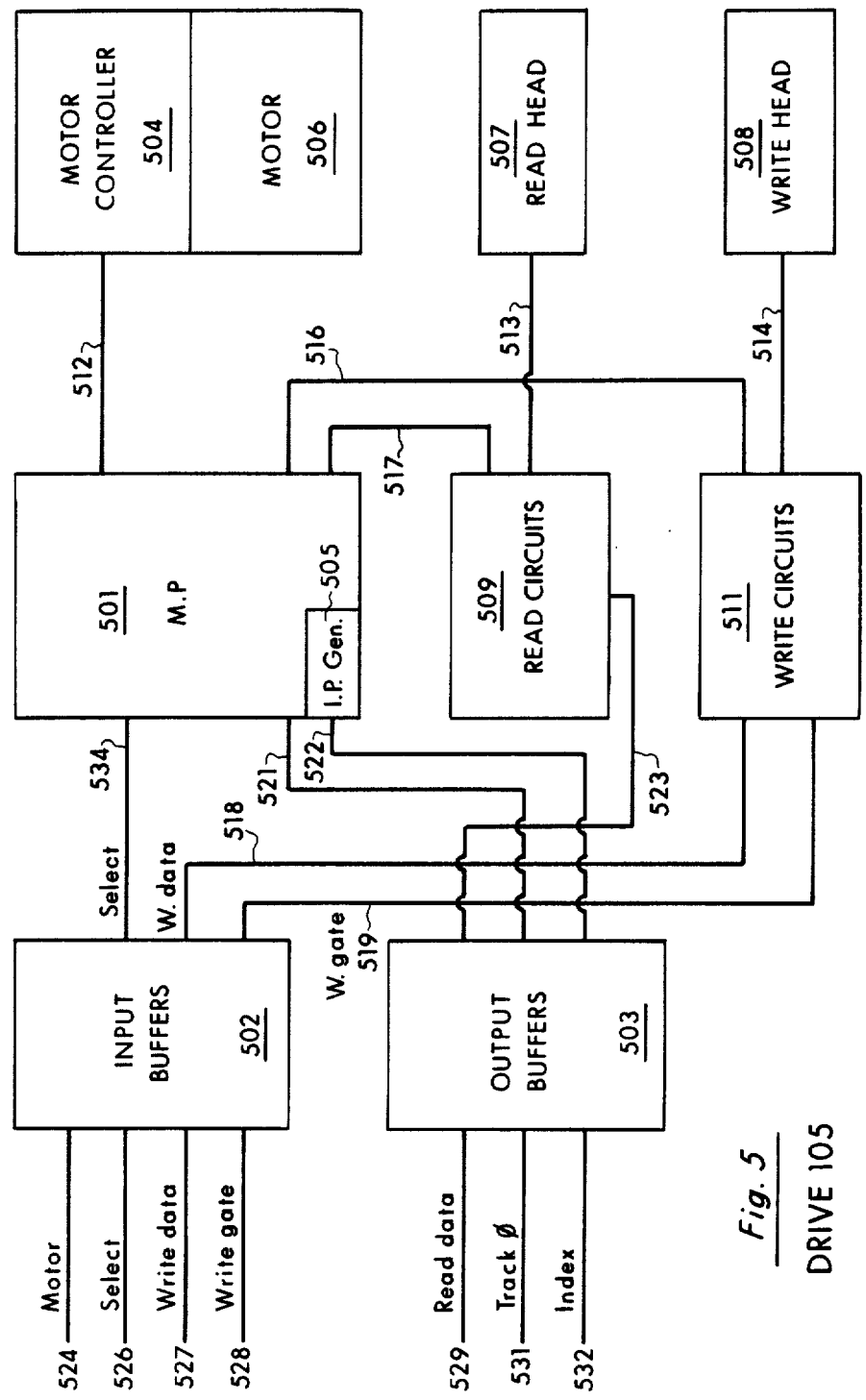
FIG. 5 illustrates the details of the drive.

FIG. 5 illustrates the details of a drive 105 embodying the invention. Drive 105 comprises a microprocessor 501, read circuits 509, write circuits 511, motor controller 504, motor 506, read head 507, and write head 508. Drive 105 further comprises input buffers 502 and output buffers 503 which interface with the computer 101 and its floppy controller 103 via the indicated conductors 524, 526, 527, 528, 529, 531 and 532. These conductors are part of path 107 on FIG. 1.

Drive 105 is controlled in its operation by microprocessor 501 operating under control of its internal memory and responding to signals received on leads 524, 526, 527, and 528. Select path 526 receives signals in a coded manner, as subsequently described, to control the microprocessor 501. The signal on path 524 is a gating signal for signals on path 526. The select signals received on path 526 are passed by buffer 502 over path 534 to microprocessor 501. The write gate lead 528 is activated when information is recorded. At this time, signals representing data to be written are received on write data path 527, extended through buffers 502 and over path 518 to write circuits 511. From there, the signals are extended over path 514 to write head 508 which writes the received data.

In the read mode, data is read by read head 507 and extended over path 513 to read circuits 509. From there, the data is extended over path 523 to output buffers 503. From buffers 503, the data is extended over read data path 529 for transmission back to floppy controller 103 of computer 101. The track 0 signal on path 531 is used as subsequently described.

Microprocessor 501 controls the speed of operation of motor 506 and its element I.P. Gen. 505 which generates index pulses representing the current operating speed of motor 506. These index pulses are applied to path 522 and extended through buffer 503 and over index line 532 for transmission back to floppy controller 103. Leads 517 and 516 permit microprocessor 501 to control the operation of read circuits 509 and the write circuits 511, respectively.

As priorly mentioned, select leads 526 and 534 apply information to microprocessor 501 representing the different tasks that microprocessor 501 and the drive are to perform. Since the select lead may cause the microprocessor to perform any one of a plurality of specified tasks, each such task is associated with a unique select lead signal. These different signals are encoded and applied to select lead 526 so that microprocessor 501 may perform the task associated with each different possible select lead signal. The manner in which the select lead encoding is performed is subsequently described.

DESCRIPTION OF FIG. 6

Figure 6:
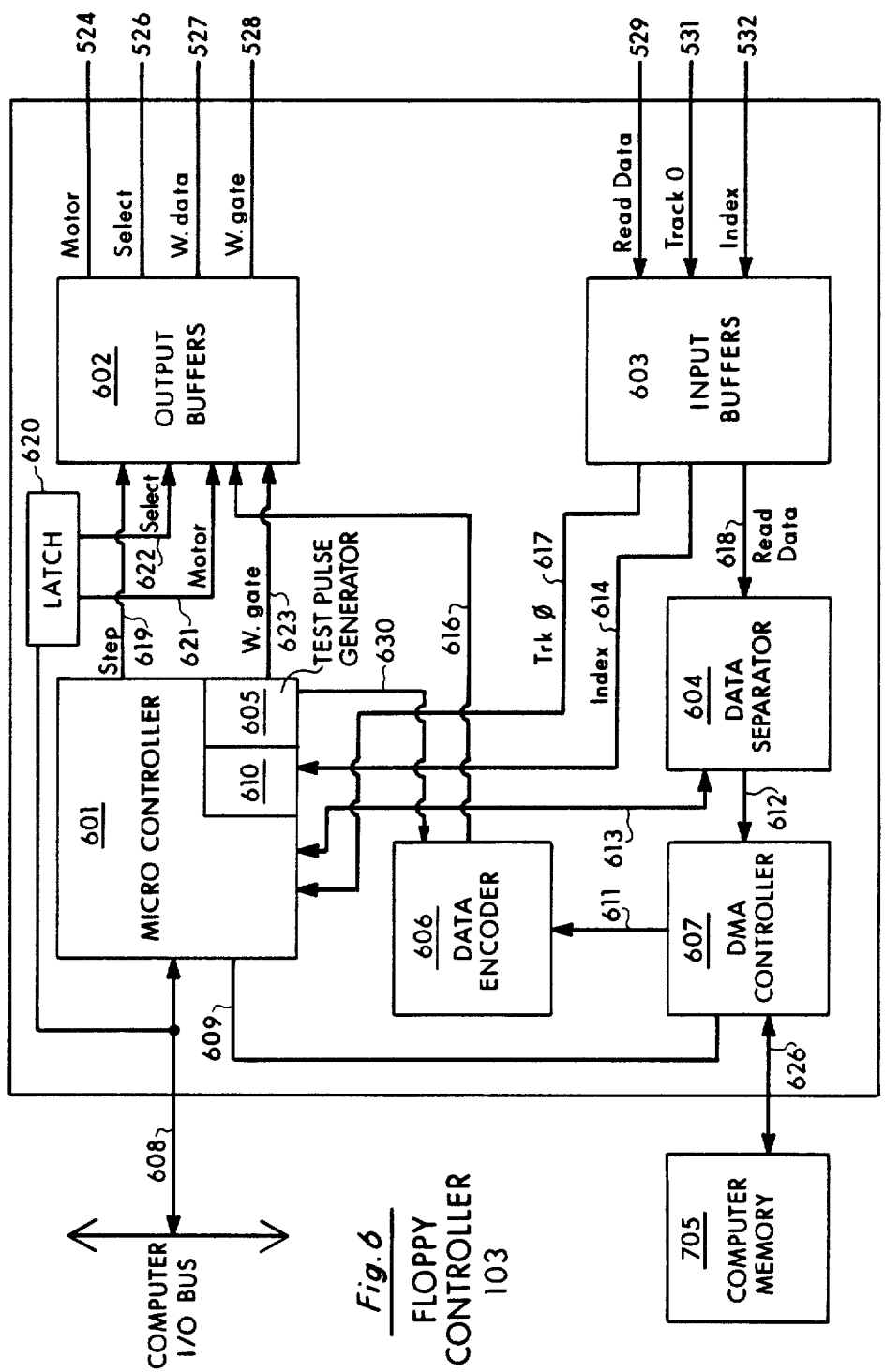
FIG. 6 illustrates the details of the floppy controller.

FIG. 6 discloses the details of floppy controller 103 together with certain elements of computer 101. Floppy controller 103 comprises microcontroller 601, output buffers 602, input buffers 603, data separator 604, data encoder 606, latch 620 and DMA controller 607. The output signals that are to be transmitted to drive 105 are generated by microcontroller 601 and applied to the drive by output buffers 602. The information received from drive 105 is received via input buffers 603. Certain of the information received by buffers 603 is applied to microcontroller 601. Other of this information is applied to data separator 604.

The computer 101 initiates a drive operation by applying a signal to motor path 621 via path 608 and latch 620. This signal is extended through buffers 602 and over path 524 to the drive. The encoded select signals are applied by the computer via path 608, latch 620, path 622, buffers 602, and path 526 for transmission to the drive. The motor signal on path 524 acts as a gate for the signals on path 526 within the drive. Microcontroller 601 and its test pulse generator 605 applies a write gate signal to path 623 for transmission over path 528 to the drive. At this time, with the write gate lead activated, the computer memory 705 may apply data that is to be recorded over path 626 to DMA controller 607, over path 611 and data encoder 606 to lead 616. The signals on path 616 are then extended through buffers 602 and over path 527 for transmission to the drive. This causes the transmitted data to be written by the drive to the medium.

The track 0 signal is received from the drive on path 531, extended through buffers 603 and applied over path 617 to microcontroller 601 as a control signal. The index pulses from the drive are received on path 532, extended through buffers 603 and applied over path 614 to element 610 of microcontroller 601. The data that is read by the drive is received on path 529, extended through buffers 603 and over path 618 to data separator 604. This element decodes the received signals and applies them over path 612 DMA controller 607 and path 626 for entry into memory 705 of the computer. Element 610 receives the index pulses from the drive on path 614.

DESCRIPTION OF FIG. 7

Figure 7:
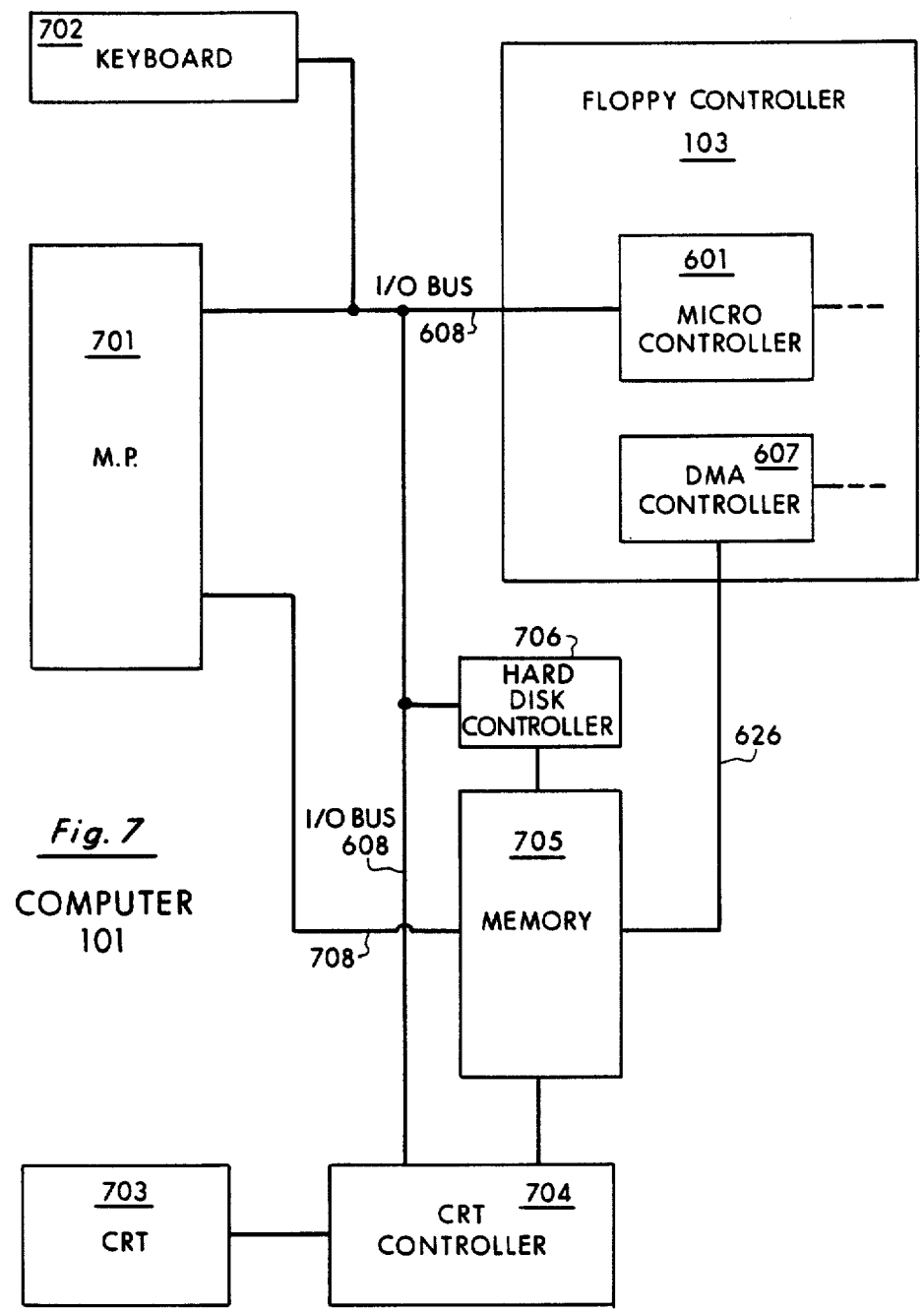
FIG. 7 illustrates the details of a computer embodying the invention.

FIG. 7 shows the details of computer 101. The computer comprises microprocessor 701, keyboard 702, CRT 703, CRT controller 704, hard disk controller 706, memory 705, and IO bus 608. The IO bus 608 interconnects microprocessor 701 of the computer with microcontroller 601 of floppy controller 103. Also connected to the IO bus is keyboard 702, and hard disk controller 706. The DMA controller 607 of floppy controller 103 permits the floppy controller to access computer memory 705 on a direct memory access basis. Microprocessor 701 of the computer and the microcontroller 601 of the floppy controller communicate with each other directly over IO bus 608. Microprocessor 701 communicates with memory 705 via path 708.

DESCRIPTION OF FIG. 8

Figure 8:
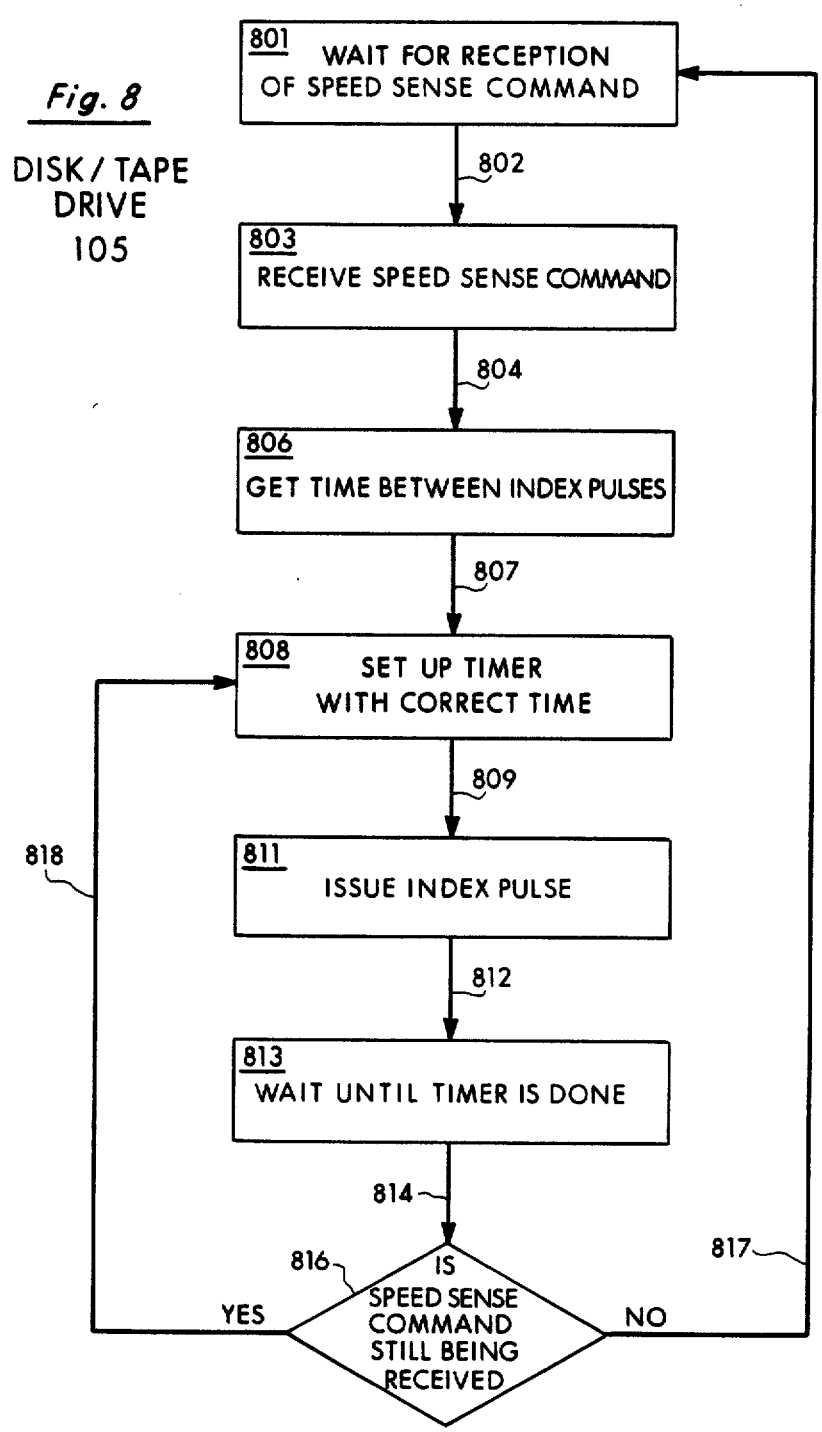
FIGS. 8, 9 and 10 are flow charts illustrating processes utilized by the drive, by the computer, and by the floppy controller, respectively, in embodying the invention.

FIG. 8 discloses the details of the process utilized by drive 105 to embody the invention. The process beings in element 801 in which drive 105 waits for the reception of a speed sense command from the floppy controller. This reception of this command begins the speed determining operation. The process advances over path 802 to element 803 when the speed sense command is received from the floppy controller. The process then advances over path 804 to element 806 which causes microprocessor 501 of drive 105 to determine the rate at which index pulses are to be generated. The pulse rate is determined by the time that is to occur between each index pulse. The interpulse time is received by drive 105 from computer 101. The initial interpulse time that is received by drive 105 represents the highest operating speed of the drive.

The process now extends over path 807 to element 808 which sets a timer within the microprocessor that times the interval of time between two successive index pulses. The process next extends over path 809 to element 811 which causes the first index pulse to be generated and applied over path 522 and through buffers 503 for transmission over index path 532 to floppy controller 103. Microprocessor 501 causes a series of index pulses to be generated at a pulse rate that is associated with the highest speed at which the drive 105 can operate. This highest speed or data rate may represent, for example, an effective tape speed of 58 inches per second and an associated data rate of 500 kilobytes per second.

The process extends over path 812 to element 813 which waits until the timer of element 808 times out. The process then extends over path 814 to decision element 816 which determines whether or not the speed sense command has been terminated by the computer. If the process has been terminated upon a determination by computer 101 that the floppy controller is compatible with the present speed of operation of drive 105, the NO output on path 817 is selected and the process goes back to element 801 in which it waits for another speed sense command process to be initiated. If, on the other hand, element 816 determines that the speed sense command has not been terminated to end the speed determining operation, the YES output of elements 816 is selected and the process extends over path 818 to element 808 which resets the timer which again times an interval of increased duration determined by element 806 under control of signals received from computer 101. The process then proceeds to element 811 which issues the next (the second) index pulse and advances to element 813 which waits until the timer times out. The process advances again to element 816 which makes another yes or no determination. The process continues in this manner until the NO output of element 816 is activated and the process returns back to element 801 to its normal or waiting state. The NO output is selected only when the computer determines that the speed determining operation should be terminated. This occurs when a speed or data rate compatible to both the drive and the floppy controller has been identified.

DESCRIPTION OF FIG. 9

Figure 9:
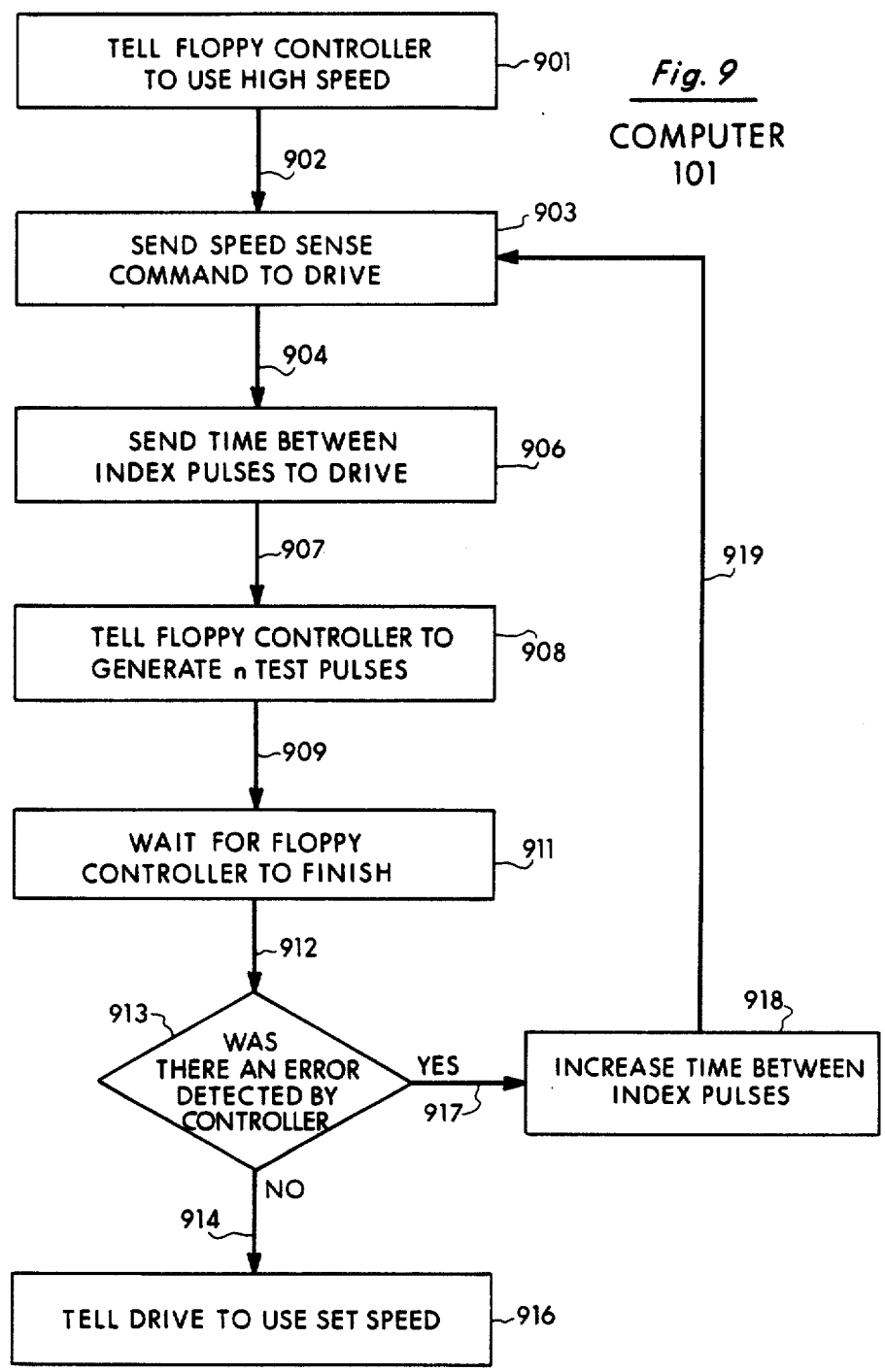

FIG. 9 discloses the process used by microprocessor 701 of computer 101 in embodying the invention. The process begins in element 901 which sends a command to the floppy controller telling it to set itself at the highest speed of which it is capable of operating. This command is desirable for multispeed controllers. The process advances over path 902 to element 903 which sends a speed sense command to the floppy controller for transmission to the drive. The drive receives this command in element 803 on FIG. 8. The process extends over path 904 to element 906 which transmits information to the drive indicating the time that is to elapse between two successive index pulses. The disk drive receives this information in element 806. The process next extends over path 907 to element 908 which sends a command to the floppy controller to generate a series of n test pulses after it receives a first index pulse from the drive. The process then extends over path 909 to element 911 which waits for the floppy controller to compare the time elapsing between the receipt of two successive impulses from the drive with the time required for the floppy controller to generate the series of n test pulses. The process next extends over path 912 to element 913 which determines whether an error was detected. An error is defined as a situation in which a second index pulse is received from the drive while the n test pulses are still in the process of being generated by the controller. If the answer to this determination is no, the process extends over path 914 to element 916 which transmits a command to the drive telling it to operate at the speed associated with the current rate at which index pulses are generated. If, on the other hand, element 913 detects an error, the process extends over the YES path 917 to element 918 which increases the time between index pulses. This causes the drive to use a lower speed to see if the floppy controller is compatible with this lower speed of the drive. The process then extends from element 918 over path 919 back to element 903 which sends a new speed sense command to the drive. Element 906 causes the new interpulse time to be sent to the drive representing the lower speed of operation defined by element 918. The process then loops back down to element 913 until the no output of the element is activated. On this second pass through the loop, elements 911 and 913 determine the compatibility of the controller and the drive for the present operating speed of the drive as represented by the rate at which index pulses are generated. The no output of element 913 is selected when the present speed of the drive and the capabilities of the floppy controller indicate a compatibility.

DESCRIPTION OF FIG. 10

Figure 10:
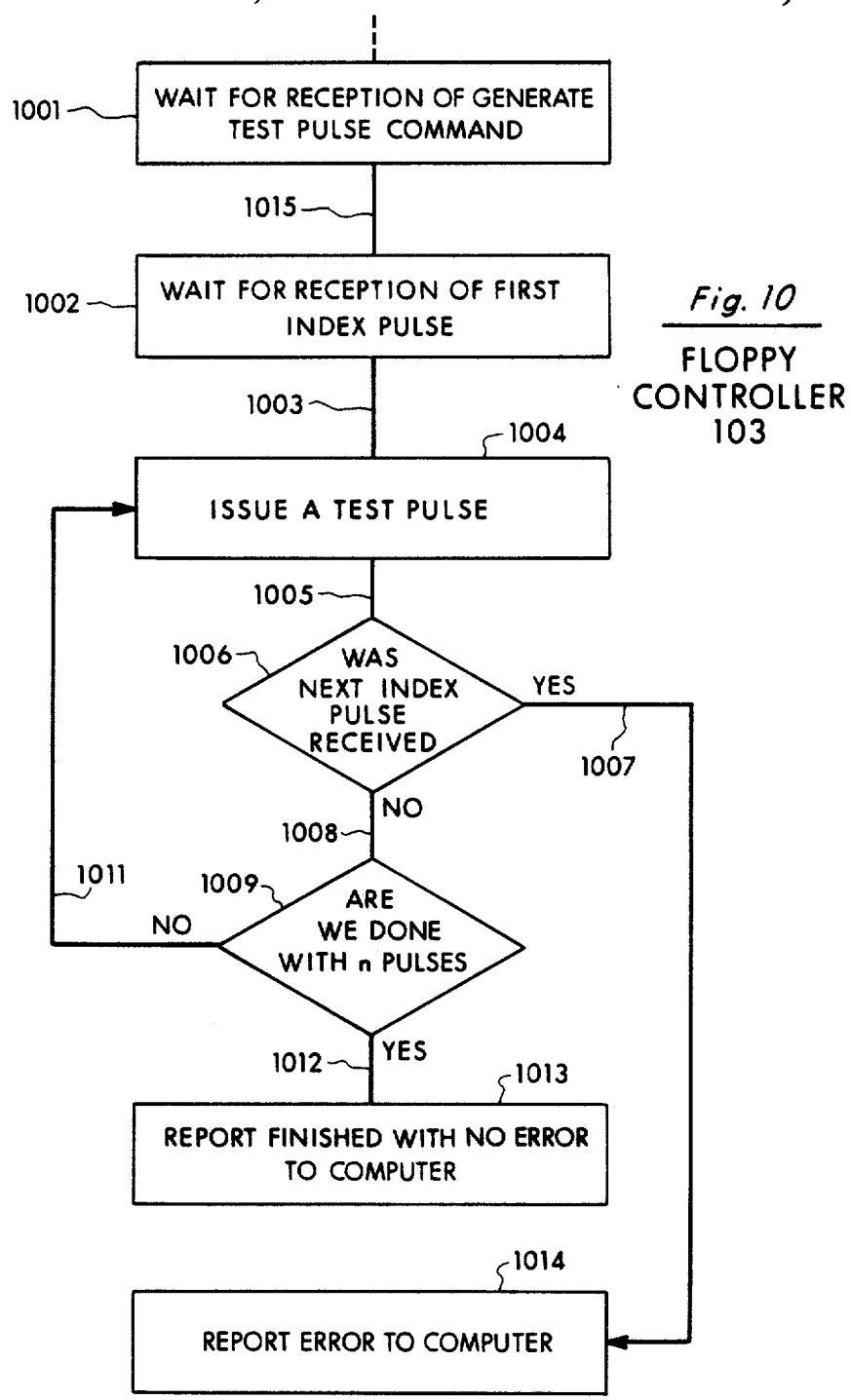

FIG. 10 illustrates the process used by microcontroller 601 of floppy controller 103 to embody the invention. The process normally resides in element 1001 in which the controller waits for the reception of a command from the computer telling the floppy controller to generate a burst of n test pulses. This command is generated by the computer in element 908 whose function has already been described. The process then advances over path 1015 to element 1002 which waits for the reception of the first index pulse from the drive. When this index pulse is received, the process advances over path 1003 to element 1004 which generates the first test pulse. The process continues over path 1005 to element 1006 which determines whether or not the next (the second) index pulse has been received from drive 105. If the second index pulse has been received, the yes output 1007 is activated and the process advances to element 1014 which reports an error to the computer. An error condition is required at this time, since this state represents a situation in which the second index pulse is received from the drive prior to the time the second test pulse is generated by the controller.

If the no output is selected by element 1006, the process extends over path 1008 to element 1009. This is a decision making element which determines whether or not n test pulses have been generated. Since at this time only one test pulse has been generated, the no output 1011 is selected and the process loops back to element 1004 which causes another test pulse to be generated. This is the second test pulse for the currently described operation. The process now loops down to element 1006 which determines whether the second index pulse has been received. If the second index pulse has been received, this represents an error situation since only two test pulses have been generated. The process then advances to element 1014.

If no error is detected, the process loops down to element 1009 which again determines whether or not n test pulses have been generated. The process continues looping in this manner until either an index pulse is generated prior to the time that n test pulses are received to represent an error condition, or element 1009 determines that n test pulses have been generated and that the second index pulse has not been received. In this case, the process advances over path 1012 to element 1013 which reports a "finished with no error situation" to the computer. This causes the computer to advance to element 916 whose function has already been described. This causes the drive to be set to the current speed at which it is operating.

DESCRIPTION OF FIGS. 11 AND 12

As priorly described, the controller sends coded messages over the select line 526 to control the operation of the drive. The drive can perform many different operations and each operation is initiated by the transmission of a unique coded message to the drive over select line 526. The drive responds to each received message and initiates the drive operation specified by the message. The drive also uses the track 0 line 531 to transmit confirmation signals back to the controller as each bit of the message is received. The following describes the manner in which the messages and signals are exchanged between the controller and the drive.

Lines 1101 and 1102 portray the signals on select line 526 and track line 531 when coded messages are transmitted from the controller to the drive. The information on select line 526 comprises the coded message that is transmitted. The information on the track 0 line 531 represents the confirmation signals transmitted back from the drive to the controller in response to the reception by the drive of each bit of a coded message on select line 526. The cross hatched areas on FIGS. 11 and 12 are "don't care" situations in which the signal may be either a high or a low.

The transmission of a message begins when line 1101 goes from a high to a low at time t1. This high to low transition is received by the drive which responds by applying a high to low transition to line 1102 at time t2. The reception of the high to low transition at time t1 on line 1101 by the floppy drive advises it that an 8 bit coded message is about to be applied to line 1101 by the controller 103. The leading edge of the first message bit (BO) is applied to line 1101 by the controller at time t3.

The drive responds to the reception of the leading edge of the first data bit at time t3 and causes line 1102 to undergo a low to high transition at time t4. With regard to bit BO, which begins at time t3, line 1101 stays low until time t5 if the value of bit BO is represented by a low on line 1101. At time t5, the signal on line 1101 undergoes a low to high transition and at time t6, the signal undergoes a high to low transition. On the other hand, if the value of bit BO is a high, the signal on line 1101 undergoes a low to high transition at time t3 and remains high until time t6 at which time it undergoes a high to low transition. The high to low transition occurs at time t6 regardless of the value of bit BO and this high to low transition on line 1101 at time t6 is acknowledged by the drive when it applies a high to low transition to line 1102 at time t7.

The low to high transition on line 1102 at time t4 is generated by the drive in response to the reception of a leading edge of the first bit. If bit BO is represented by a high, the low to high transition at time t4 on line 1102 is generated in response to the low to high transition on line 1101 at time t3. On the other hand, if the value of bit BO is represented by a low, then the low to high transition on line 1102 at time t4 is generated solely in response to a timing function and, in particular, is generated in response to the occurrence of a predetermined amount of time following the high to low transition on line 1102 at time t2.

The remaining bits, bits B1 through B7, of the eight bit sequence are generated in exactly the same manner as bit BO and are represented by signals on line 1101 and 1102 that are comparable to the signals already described for bit BO.

FIG. 12 illustrates the signals that occur on select line 526, and on track 0 line 531 as the drive responds to the reception of a coded message of FIG. 11 from the controller and applies a corresponding coded message to the track 0 line 531 for transmission back to the controller. The track 0 line 531 is a high prior to the transmission of a coded message back to the controller. This is shown on line 1204 on FIG. 12 to the left of time t1. At time t1, the drive causes the signal on line 1204 to undergo a high to low transition. This transition is received by the controller which responds with a confirmation signal by applying a high to low transition to line 1203 at time t2. The drive begins the transmission of the first message bit (BO) at time t3. If this bit is represented by a low, line 1204 remains low at time t3. If this first bit is represented by a high, line 1204 undergoes a low to high transition at time t3. In any event, the controller responds at time t4 by causing line 1203 to undergo a low to high transition. The bit BO ends at time t5 and at time t6 the drive causes the high to low transition to appear on line 1204. This transition at this time advises the controller that the first data bit has been sent. The controller responds at time t7 by causing line 1203 to undergo a high to low transition. The remaining 7 of the 8 message bits are transmitted in exactly the same manner by the application of the indicated signals to line 1204. The controller responds to the reception of each of bits B1–B7 in exactly the same manner as described for the reception of bit BO by applying signals to line 1203.

In summary, the signaling techniques used to transmit coded messages between the controller and the drive provide extremely high reliability. First of all, the transmission of each bit of each coded message is accompanied by a corresponding confirmation signal in response to the reception of each message bit. Secondly, the reception of a coded message by the drive, as shown on FIG. 11, is followed by the transmission of the same message back to the controller as a verification of the particular message that was received.

The foregoing has as described a first possible embodiment of the invention. In this first embodiment the speed of the drive is set by finding a data rate of the drive for which the floppy controller can generate a sequence of n test pulses in the time interval between two successive index pulses from the drive. The following paragraphs describe an alternative embodiment in which (1) n test pulses are generated by the floppy controller, (2) the data rate at which the floppy controller is operating is determined by measuring the time required for the controller to generate the n test pulses, and (3) the drive is then instructed to operate at the same data rate at which the floppy controller is operating.

Figure 15:
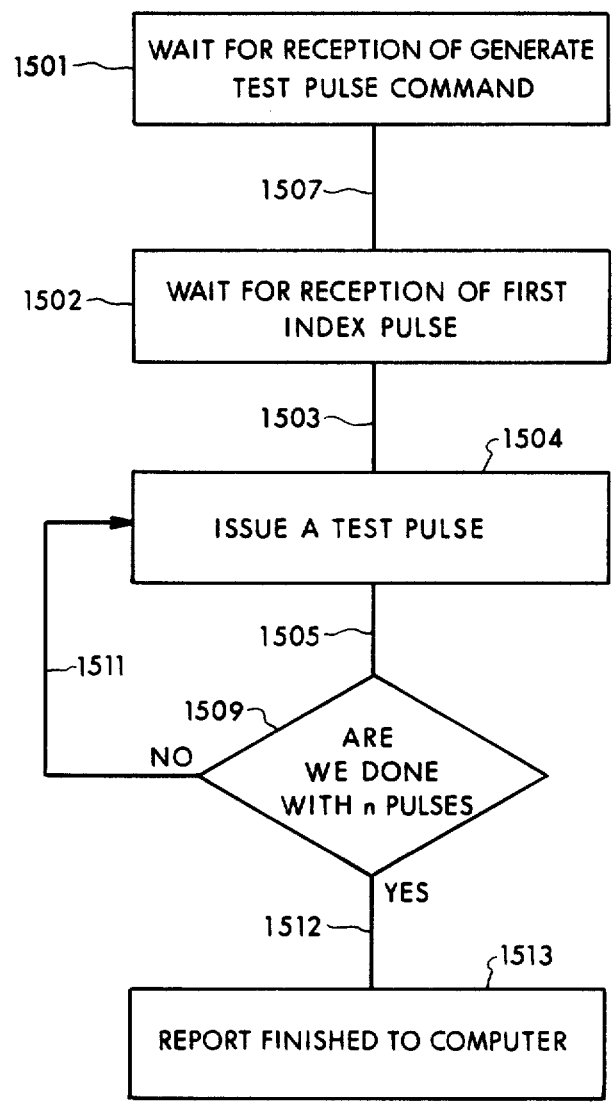

FIGS. 1, 5, 6, 7, and 8, which have been priorly described in detail, pertain to both embodiments. FIGS. 2, 3, 4, and 9 through 13 pertain only to the first described embodiment. FIGS. 8, 14, and 15 disclose the process used in embodying the alternative embodiment described in the following paragraphs.

With respect to the process of FIG. 8, which pertains to the drive 105, the drive operates in exactly the same manner priorly described for the first embodiment. Namely, the drive waits for the reception of a speed sense command, receives the speed sense command, receives information indicating the time between index pulses, sets up its timer to time the indicated interpulse interval and then generates index pulses under control of the timer. Since the operation of FIG. 8 has already been described in connection with the first embodiment, it is not described again herein in detail.

FIG. 14 illustrates the process used by computer 101 in embodying the alternative embodiment of the invention. The process begins on FIG. 14 with element 1401 in which the computer tells the floppy controller to use its highest speed. The process then continues over path 1402 to element 1403 in which the computer causes a speed sense command to be sent to the drive. The process then extends over path 1404 to element 1406 which sends information to the drive indicating the time interval that is to elapse between successive index pulses generated by the drive. The process then extends over path 1407 to element 1408 which tells the floppy controller to generate n test pulses. As subsequently described, the floppy controller generates a series of n test pulses when the first index pulse is received from the floppy drive.

The process extends over path 1409 to element 1418 which starts the timer within computer 101. The function of this timer is to determine the time required by the controller to generate the series of n test pulses. The process then extends over path 1419 to element 1411 in which the computer 101 waits for the floppy controller to generate its series of n test pulses. When the series of n test pulses is generated, the process continues over path 1420 to element 1413 in which the controller reads the setting of the timer that was actuated by element 1418. The setting of this timer represents the duration of time required by the floppy controller to generate the series of n test pulses.

The process then continues over path 1412 to element 1417 which determines the speed at which the drive should operate in order that the drive can be compatible with the data rate at which the controller is operating, as indicated by the timer reading in element 1413. The process then continues over path 1414 to element 1416 in which the computer tells the drive to operate at the speed determined by element 1417.

FIG. 15 discloses the process used by floppy controller 103 to embody the alternative embodiment of the invention. The process begins at element 1501 in which the controller waits for the reception of a "generate test pulse" command from the computer. The process then extends over path 1507 to element 1502 in which the controller waits for the reception of a first index pulse from the drive. The process then extends over path 1503 to element 1504 in which the floppy controller generates a first test pulse when the first index pulse is received from the drive. The process extends over path 1505 to element 1509 which decides whether or not n test pulses have been generated. Since at the current time only one test pulse has been generated, the no output of element 1509 is selected and the process loops back over path 1511 to element 1504 which issues a second test pulse. The process continues in this manner and element 1509 causes the process to loop back to element 1504 until the nth test pulse is generated. At that time, the yes output of element 1509 is selected and the process extends over path 1512 to element 1513 which provides an indication to the computer that all n test pulses have been generated. Element 1413 within the computer then reads the time required for the n test pulses to be generated and elements 1417 and 1416 then cause the drive speed to be set at a rate that is compatible with the rate at which the floppy controller is operating in accordance with FIG. 15.

The alternative embodiment of the invention just disclosed is simpler than the first embodiment in that the controller operates at its highest possible data rate under control of the computer. The drive is then instructed by the computer to operate at a speed associated with the data rate of the floppy controller. The data rate of the floppy controller is dependent upon the duration of time required by the controller to generate the series of n test pulses.

This alternative embodiment of the invention differs from the first described embodiment in which an iterative process compares the time required by the controller to generate a series of n test pulses with the interpulse time of the index pulses generated by the drive. The iterative process continues until a drive speed and an interpulse time for the index pulses is obtained that is greater than the time required for the controller to generate the series of n test pulses.

While preferred embodiments of the present invention have been shown, it is to be expressly understood that modifications and changes may be made thereto and that the present invention is set forth in the following claims.

I claim:

1. In a computer controlled data processing system having a controller and a drive operating at any one of a predetermined plurality of different data rates and connected to said controller for exchanging data between said controller and said drive, a method of controlling the operational data rate of said drive to provide data rate compatibility between said drive and said controller, said method comprising the steps of:

transmitting a first command from said computer to said drive for operating said drive to generate a firs signal representing a high operational data rate of said drive, transmitting said first signal from said drive to said controller, generating a second signal in said controller in response to the reception of said first signal by said controller with said second signal representing a data rate at which said controller can operate, operating said controller to compare said first and second signals to determine whether the data rate represented by said first signal exceeds the data rate represented by said second signal, transmitting an output signal from said controller to said computer in response to said determination indicating whether the data rate represented by said first signal exceeds the data rate represented by said second signal, transmitting a second command from said computer to said drive to set the operational data rate of said drive at the data rate represented by said first signal if said output signal of said controller indicates that the data rate represented by said first signal does not exceed the data rate represented by said second signal, and generating an error signal in said controller to select a lower one of said predetermined plurality of data rates of said drive if said output signal indicates that said data rate represented by said first signal exceeds the data rate represented by said second signal.

2. The method of claim 1 in combination with the additional steps of:

generating a third signal in said drive representing a lower one of said predetermined plurality of operational data rates of said drive in response to the generation of said error signal;

transmitting said third signal from said drive to said controller, generating said second signal in said controller in response to the reception of said third signal, comparing said second and third signals in said controller to determine if said data rate represented by said third signal exceeds the data rate represented by said second signal, transmitting a second output signal from said controller to said computer in response to said comparison of said second and third signals with said second output signal indicating whether the data rate represented by said third signal exceeds the data rate represented by said second signal, operating said computer and said controller to set the operational data rate of said drive to the data rate represented by said third signal if said second output signal indicates that the data rate represented by said third signal does not exceed the data rate represented by said second signal, and operating said computer and said controller to reduce the operational data rate of said drive to a data rate that does not exceed the data rate represented by said second signal if said second output signal indicates that the data rate represented by said second signal is less than the data rate represented by said third signal.

3. In a computer controlled data processing system having a controller and a drive operating at any one of a predetermined plurality of different data rates and connected to said controller for recording data transmitted from said controller to said drive and for transmitting data read by said drive to said controller, a method of controlling the speed and a corresponding data rate of said drive to provide data rate compatibility between said drive and said controller, said method comprising the steps of:

transmitting a first command from said computer to said drive for operating said drive to generate a first signal representing a high data rate and corresponding high speed at which said drive can operate, transmitting said first signal from said drive to said controller, operating said controller in response to the reception of said first signal to generate a second signal representing a data rate at which said controller can operate, operating said controller to compare said first and second signals to determine whether the data rate represented by said first signal exceeds the data rate represented by said second signal, transmitting an output signal from said controller to said computer in response to said determination indicating whether the data rate represented by said first signal exceeds the data rate represented by said second signal, transmitting a second command from said computer to said drive to set the speed and operational data rate of said drive at the speed and data rate represented by said first signal if said output signal of said controller indicates that said data rate represented by said first signal does not exceed the data rate represented by said second signal so that said controller can operate at a rate corresponding to said high data rate of said drive, and generating an error signal in said controller to select a lower one of said predetermined plurality of operational data rate of said drive if said output signal indicates that said data rate represented by said first signal exceeds the data rate represented by said second signal so that said controller cannot operate at said high data rate of said drive.

4. The method of claim 3 in combination with the additional steps of:

operating said drive in response to the generation of said error signal by said controller to generate a third signal representing a reduced data rate corresponding to a reduced speed of said drive, transmitting said third signal to said controller, operating said controller in response to the reception of said third signal to generate said second signal, comparing said second and third signals in said controller to determine whether the data rate represented by said third signal exceeds the data rate represented by said second signal, transmitting a second output signal from said controller to said computer in response to said comparison of said second and third signals with said second output signal indicating whether the data rate represented by said third signal exceeds the data rate represented by said second signal, operating said computer and said controller to set said drive to said reduced speed and data rate if said second output signal indicates that the data rate represented by said third signal does not exceed the data rate represented by said second signal so that said controller can operate at said reduced data rate, and operating said computer and said controller to lower the data rate and operational speed of said drive to a rate compatible with said controller if said second output signal indicates that the data rate represented by said third signal exceeds the data rate represented by said second signal so that said controller cannot operate at said reduced data rate represented by said third signal.

5. In a computer controlled data processing system having a controller and a peripheral record/playback device adapted to operate at any one of a predetermined plurality of different data rates and speeds and connected to said controller for recording data transmitted from said controller to said device and for transmitting data read by said device to said controller, a method for controlling the operational speed and corresponding data rate of said device to provide data compatibility between said device and said controller, said method comprising the steps of:

transmitting a first command from said computer to said device for generating a series of index pulses in said device representing the highest operational speed and data rate of said device, transmitting said index pulses from said device to said controller, generating a series of n test pulses in said controller representing a controller operational data rate in response to the reception of a first index pulse of said series by said controller, operating said controller to determine whether a second index pulse of said series is generated by said device prior to the time that the nth test pulse of said series is generated by said controller, transmitting a second command from said computer to said device to set the operational speed and data rate of said device at said highest speed and data rate if said nth test pulse is generated prior to the time that said second index pulse is generated, and reducing the rate at which said index pulses are generated and the corresponding operational speed of said device to a rate compatible with the controller data rate represented by said n test pulses generated by said controller if said second index pulse is generated by said device prior to the generation of said nth test pulse.

6. In a data computer controlled processing system having a controller and a peripheral record/playback device adapted to operate at any one of a predetermined plurality of different data rates and connected to said controller for recording data transmitted from said controller to said device and for transmitting data read by said device to said controller, a method for controlling the data rate and corresponding speed of said device to provide data compatibility between said device and said controller, said method comprising the steps of:

sending information from said computer to said device specifying the time between successive index pulses to be generated by said device, generating a series of index pulses in said device representing a high one of said data rates and corresponding operational speed of said device and having said specified time between successive index pulses, transmitting said index pulses, one pulse at a time, from said device to said controller, generating a series of n test pulses in said controller representing a controller operational data rate in response to the reception of a first index pulse of said series of said controller, determining whether a second index pulse is received from said device by said controller prior to the time that the nth test pulse of said series is generated by said controller, operating said computer to set the data rate and operational speed of said device at said high speed and data rate if said nth test pulse is generated by said controller prior to the time that said second index pulse is received from said device, and generating an error signal if said second index pulse is received by said controller prior to the time that said nth test pulse is generated in said controller to select a lower one of said predetermined plurality of operational data rates of said device.

7. The method of claim 6 in combination with the steps of:

sending information from said computer to said device in response to the generation of said error signal with said information instructing said device to increase the time between successive index pulses to be generated by said device, generating a series of index pulses in said device having an increased time between successive index pulses and representing a lower operational data rate and speed of said device, transmitting said last named series of index pulses from said device to said controller, generating a series of n test pulses in said controller in response to the reception of the first index pulse of said last named series of index pulses, operating said computer to set the data rate and operational speed of said device to the data rate and speed represented by said last named series of index pulses if the nth test pulse is generated by said controller before the reception of the second index pulse of said last named series of index pulses, and reducing the rate at which index pulses are generated by said device to represent a device data rate and speed compatible with the controller data rate represented by the rate at which said test pulses are generated by said controller if said second index pulse of said lower rate series is not received prior to the generation of said nth test pulse.

8. In a computer controlled data processing system having a controller and a drive operating at any one of a predetermined plurality of different data rates and connected to said controller for exchanging data between said controller and said drive, means for controlling the operational data rate of said drive to provide data rate compatibility between said drive and said controller, said means for controlling comprising:

means in said drive for generating a first signal representing a high operational data rate of said drive in response to a receipt by said drive of a first command from said computer, means for transmitting said first signal from said drive to said controller, means in said controller for generating a second signal in response to the reception of said first signal by said controller with said second signal representing a data rate at which said controller can operate, means in said controller for comparing said first and second signals to determine whether the data rate represented by said first signal exceeds the data rate represented by said second signal, means for transmitting an output signal from said controller to said computer in response to said determination indicating whether the data rate represented by said first signal exceeds the data rate represented by said second signal, means including said computer responsive to the receipt of said output signal for setting the operational data rate of said drive at the data rate represented by said first signal if said output signal indicates that the data rate represented by said first signal does not exceed the data rate represented by said second signal, and means including said computer responsive to the receipt of said output signal for generating an error signal to select a lower one of said predetermined plurality of said data rates of said drive if said output signal indicates that said data rate represented by said first signal exceeds the data rate represented by said second signal.

9. The system of claim 8 in combination with:

means for generating a third signal in said drive representing a lower one of said plurality of operational data rates of said drive in response to the generation of said error signal;

means for transmitting said third signal from said drive to said controller, means in said controller for generating said second signal in response to the reception of said third signal, means in said controller for comparing said second and third signals to determine if said data rate represented by said third signal exceeds the data rate represented by said second signal, means for transmitting a second output signal from said controller to said computer in response to said comparison of said second and third signals with said second output signal indicating whether the data rate represented by said third signal exceeds the data rate represented by said second signal, means including said computer responsive to the receipt of said second output signal for setting the operational data rate of said drive to the data rate represented by said third signal if said comparing means determines that the data rate represented by said third signal does not exceed the data rate represented by said second signal, and means including said computer responsive to the receipt of said second output signal for reducing the operational data rate of said drive to a data rate that does not exceed the data rate represented by said second signal if said comparing means determines that the data rate represented by said second signal is less than the data rate represented by said third signal.

10. In a computer controlled data processing system having a controller and a multispeed peripheral drive operating at any one of a predetermined plurality of different data rates and connected to said controller for recording data transmitted from said controller to said drive and for transmitting data ready by said drive to said controller, means for controlling the operating speed and corresponding operational data rate of said drive to provide data rate compatibility between said drive and said controller, said means for controlling comprising:

means for operating said drive in response to a signal received by said drive from said computer to generate a first signal representing a high data rate and corresponding high speed at which said drive can operate.

means for transmitting said first signal from said drive to said controller, means for operating said controller in response to the reception of said first signal by said controller to generate a second signal representing a data rate at which said controller can operate, means in said controller for comparing the data rates represented by said first and second signals to determine whether the data rate represented by said first signal exceeds the data rate represented by said second signal, means for transmitting an output signal from said controller to said computer in response to said determination indicating whether the data rate represented by said first signal exceeds the data rate represented by said second signal, means including said computer responsive to the receipt o said output signal for setting the speed and data rate of said drive at said high speed and data rate if said output signal indicates that said data rate represented by said first signal does not exceed the data rate represented by said second signal so that said controller can operate at a data rate corresponding to said high data rate of said drive, and means including said computer for generating an error signal if said output signal indicates that said data rate represented by said first signal exceeds the data rate represented by said second signal so that said controller cannot operate at said last named data rate.

11. The system of claim 10 in combination with:

means including said computer for operating said drive in response to the generation of said error signal to generate a third signal in said drive representing a reduced data rate corresponding to a reduced operational speed of said drive, means for transmitting said third signal to said controller, means for operating said controller in response to the reception of said third signal to generate said second signal, means in said controller for comparing the data rates represented by said second and third signals to determine whether the data rate represented by said third signal exceeds the data rate represented by said second signal, means for transmitting a second output signal from said controller to said computer in response to said comparison of said second and third signals with said second output signal indicating whether the data rate represented by said third signal exceeds the data rate represented by said second signal, means including said computer and said controller for setting the operational speed and data rate of said drive to said reduced speed and data rate if said second output signal indicates that the data rate represented by said third signal does not exceed the data rate represented by said second signal so that said controller can operate at said reduced data rate, and means including said computer and said controller for lowering the operational speed and corresponding operational data rate of said drive to a rate compatible with a data rate of said controller if said second output signal indicates that the data rate represented by said third signal exceeds the data rate represented by said second signal so that said controller cannot operate at said reduced data rate represented by said third signal.

12. In a computer controlled data processing system having controller adapted to operate at any one of a predetermined plurality of different data rates and a peripheral record/playback device adapted to operate at any one of a predetermined plurality of different data rates and connected to said controller for recording data transmitted from said controller to said device and for transmitting data read by said device to said controller, means for controlling the operational speed and data rate of said device to provide data compatibility between said device and said controller, said means for controlling comprising:

means in said device responsive to a control signal received from said computer for generating a series of index pulse representing the highest operational speed and data rate of said device, means in said controller for generating a series of n test pulses representing the operational data rate of said controller in response to the generation by said device of a first index pulse of said series, means in said controller for determining whether a second index pulse of said series is generated prior to the time that the nth test pulse of said series is generated, means including said computer for setting the operating speed and data rate of said device at said highest speed and data rate if said nth test pulse is generated prior to the time that said second index pulse is generated, and means including said computer for generating an error signal if said second index pulse is generated prior to the time that said nth test pulse is generated in said controller to select a lower one of said predetermined plurality of data rates of said device.

13. The system of claim 12 in combination with:

means in said device for generating a series of index pulses at a lower rate representing a lower operational speed and data rate of said device in response to the generation of said error signal, means in said controller for generating a series of n test pulses in response to the generation of the first index pulse of said lower rate series of index pulses, means including said computer for setting the operational speed and data rate of said device to the speed and data rate represented by said lower rate series of index pulses if said nth test pulse is generated before the generation of the second index pulse of said lower rate series of index pulses, and means including said computer for reducing the operational speed and data rate of said device to a rate compatible with the rate represented by said series of n test pulses if said second index pulse of said lower rate series is generated prior to the generation of said nth test pulse.

14. In a computer controlled data processing system having a controller and a peripheral record/playback device adapted to operate at any one of a predetermined plurality of different data rates and connected to said computer for recording data transmitted from said controller to said device and for transmitting data read by said device to said controller, means for controlling the operational data rate of said device to provide data compatibility between said device and said controller, said means for controlling comprising:

means for sending information from said computer to said device specifying the time between successive index pulses to be generated by said device, means for generating a series of index pulse in said device representing a high operational data rate of said device and having said specified time between successive index pulses, means for transmitting said index pulses, one pulse at a time, from said device to said controller, means for generating a series of n test pules in said controller representing an operational data rate of said controller in response to the reception of a first index pulse of said series by said controller, means for operating said controller to determine whether a second index pulse of said series in received by said controller prior to the time that the nth test pulse of said series is generated by said controller, means including said computer for setting the operational data rate of said device at said high data rate if said nth test pulse is generated by said controller prior to the time that said second index pulse is received from said device, and means including said computer for generating an error signal to select a lower one of said operational data rates of said device if said second index pulse is received prior to the time that said nth test pulse is generated.

15. The system of claim 14 in combination with:

means responsive to the generation of said error signal for sending information from said computer to said device instructing said device to increase the time between successive index pulses to be generated by said device, means for generating a series of index pulses having an increased time between successive pulses and representing a lower operational data rate of said device, means for transmitting said last named index pulses from said device to said controller, means for generating a series of n test pulses in said controller representing an operational controller data rate in response to the reception of the first index pulse of said last named series of index pulses, means including said computer for setting the operational data rate of said device to said lower index pulses if said nth test pulse is generated by said controller before the reception of the second index pulse of said last named series of index pulses, and means including said computer for reducing the operational data rate of said device to a rate representing a data rate compatible with the rate at which said test pulses are generated by said controller if said second index pulse of said lower rate series is received prior to the generation of said nth test pulse.

16. In a data processing system having a computer and a floppy controller and a peripheral record/-playback device adapted to operate at any one of a predetermined plurality of different data rates and connected to said computer for recording data transmitted from said computer to said device and for transmitting from by said device to said computer, a method of controlling the speed and corresponding operational data rate of said device to provide data compatibility between said device and said controller, said method comprising the steps of:

operating said computer to determine an interpulse time representing the time between successive index pulses to be generated by said device, transmitting information specifying said interpulse time via said controller to said device, setting a timer in said device to measure said specified interpulse time, operating said device under control of said timer to generate a series of index pulse having said specified interpulse time and representing a high operational speed and data rate of said device, transmitting each generated index pulse to said controller, operating said controller to generate a series of n test pulses representing an operational controller data rate in response to the reception of the first index pulse of said series from said device, determining whether a second index pulse of said series is received by said controller prior to the time that the nth test pulse of said series is generated by said controller, transmitting a signal from said computer to said device for setting the operating speed of said device at said high speed and data rate if said nth test pulse is generated prior to the time that said second index pulse is received, and generating an error signal in said controller if said second index pulse is received by said controller prior to the time that said nth test pulse is generated in said controller to select a lower one of said predetermined plurality of operational data rates of said device.

17. The method of claim 16 in combination with the additional steps of:

operating said computer in response to the generation of said error signal to specify a longer interpulse time for index pulses to be generated by said device, transmitting information specifying said longer interpulse time via said controller to said device, setting said timer in said device to measure said longer interpulse time, generating a series of index pulses in said device having said longer interpulse time and representing a lower operational speed and data rate of said device, transmitting said last named series of index pulses to said controller, generating a series of n test pulses in said controller in response to the reception by said controller of the first index pulse of said last named series of index pulses, setting the operational speed and data rate of said device to said lower speed dna data rate represented by said last named series of index pulses if said nth pulse of said last named series of test pulses is generated before the reception by said controller of the second index pulse of said last named series of index pulses, and increasing said interpulse time to be measured by said timer in said device to reduce the operational speed and data rate of said device to a rate compatible with the data rate represented by said test pulse generated by said controller if said second index pulse of said lower rate series is generated prior to the generation of said nth test pulse.

18. The system of claim 17 in combination with the steps of:
   transmitting coded multibit messages from said controller to said device to effect different operational functions of said device with each function being associated with a unique message,
   sending a confirmation signal back to said controller as each bit of a coded message is received by said device, and
   sending a coded reply message to said controller in response to the reception of a coded message by said device.

19. In a data processing system having a computer and a floppy controller and a multispeed peripheral record/playback device adapted to operate at any one of a predetermined plurality of different data rates and connected to said computer for recording data transmitted from said computer to said device and for transmitting data read by said device to said computer, means for controlling the speed and corresponding operational data rate of said device to provide data compatibility between said device and said computer, said last named means comprising:
   means for operating said computer to determine an interpulse time presenting the time between successive index pulses to be generated by said device,
   means including said computer for transmitting information specifying said interpulse time set via said controller to said device,
   means for setting a timer in said device to measure said specified interpulse time,
   means for operating said device under control of said timer to generate a series of index pulses having said specified interpulse time and representing a high operational speed of said device,
   means for transmitting each generated index pulse from said device to said controller, means for operating said controller to generate a series of n test pulses representing a controller operational data rate in response to the reception of the first index pulse of said series by said controller,
   means for determining whether a second index pulse of said series is received from said device by said controller prior to the time that the nth test pulse of said series is generated by said controller,
   means for transmitting a signal from said computer to said device for setting the operational speed and data rate of said device at said high speed and data rate if said nth test pulse is generated prior the time that said second index pulse is generated, and
   means for generating an error signal is said second index pulse is received by said controller prior to the time that said nth test pulse is generated in said controller to select a lower one of said predetermined plurality of operational data rates of said device.

20. The apparatus of claim 19 wherein said last named means comprises:
   means of operating said computer in response to the generation of said error signal to specify an increased interpulse time between successive index pulses to be generated by said device,
   means including said computer for transmitting information specifying said increased interpulse time via said controller to said device,
   means for setting said timer in said device to measure said increased interpulse time,
   means in said device for generating a series of index pulses controlled by said timer and having said increased interpulse time and representing a lower operational speed and data rate of said device,
   means for transmitting said index pulses having said increased interpulse time to said controller,
   means for generating a series of n test pulses in said controller in response to the reception by said controller of the first index pulse of said last named series of index pulses,
   means for setting the operational speed and data rate of said device to said lower speed and data rate represented by said last named series of index pulses if said nth test pulse is generated before the reception by said controller of the second index pulse of said last named series of index pulses, and
   means for increasing said time interval timed by said timer to reduce the operational speed and data rate of said device to a rate compatible with the data rate represented by said test pulses generated by said controller if a second index pulse of said last named series is generated prior to the generation of said nth test pulse.

21. The system of claim 20 in combination with:
   means including said computer for transmitting coded multibit messages from said controller to said device to effect different operational functions of said device with each function being associated with a unique message,
   means for sending a confirmation signal back to said controller as each bit of a message is received by said device, and
   means for sending a coded reply message to said controller in response to the reception of a coded message by said device.

22. In a computer controlled data processing system having a controller and a drive operation at any one of a predetermined plurality of different data rates and connected to said controller for exchanging data between said controller and said drive, a method of controlling the operational data rate of said drive to provide data rate compatibility between said drive and said controller, said method comprising the steps of:
   transmitting a first control signal from said computer to said controller,
   operating said controller in response to the reception of said control signal for generating a rate signal in said controller representing a data rate at which said controller can operate,
   transmitting said rate signal from said controller to said computer,
   operating said computer in response to the receipt of said rate signal to determine the operational data rate of said controller, and
   transmitting a second control signal from said computer to said drive to cause said drive to operate at said data rate of said controller as represented by said rate signal generated by said controller.

23. In a computer controlled data processing system having a controller and a multispeed drive operating any one of a predetermined plurality of different data rates and connected to said controller for recording data transmitted from said controller to said drive and for transmitting data read by said drive to said controller, a method of controlling the speed and corresponding operational data rate of said drive to provide data rate compatibility between said drive and said controller, said method comprising the steps of:

transmitting a control signal from said computer to said drive, operating said drive to generate a first signal in response to the reception of said control signal from said computer, transmitting said first signal from said controller to said computer, operating said computer in response tot eh reception of said rate signal from said controller to determine the operational data rate of said drive that is compatible with the data rate of said controller as represented by said rate signal generated by said controller, and operating said computer to send a command to said drive to set the data rae of said drive at said determined data rate of said controller.

24. In a computer controlled data processing system having a controller and a peripheral record/playback device adapted to operate at any one of a predetermined plurality of different data rates and connected to said controller for recording data transmitted from said controller to said device and for transmitting data read by said device to said controller, a method for controlling the operation speed and data rate of said device to provide data compatibility between said device and said controller, said method comprising the steps of:

transmitting a signal from said computer to said device for operating said device to generate a series of index pulses, transmitting each generated index pulse from said device to said controller, generating a series of n test pulses in said controller in response to the reception of a first index pulse of said series from said device, operating said computer to measure the time required for said controller to generate said series of n test pulses, operating said computer to determine the data rate at which said controller is operating in response to said time measurement, and operating said computer to set the operational speed and data rate of said device at a speed and data rate compatible with said determined data rate of said controller.

25. The method of claim 24 in combination with the steps of:

operating said computer for transmitting coded messages from said controller to said device to effect different operational functions of said device with each function being associated with a unique message, sending a confirmation signal back to said controller as each bit of a message is received by said device, and sending a coded reply message to said controller in response to the reception of a coded message by said device.

26. In a computer controlled data processing system having a controller and a multispeed peripheral drive operating at any one of a predetermined plurality of different data rates and connected to said controller for recording data transmitted from said controller to said drive and for transmitting data read by said drive to said controller, means for controlling the operating speed and corresponding operational data rate of said drive to provide data rate compatibility between said drive and said controller, said means for controlling comprising:

means for transmitting a first command from said computer to said drive, means for operating said drive to generate a first signal in response to the reception of said first command received by said drive from said computer, means for transmitting said first signal from said drive to said controller, means for operating said controller in response to the reception of said first signal to generate a rate signal representing a data rate at which said controller can operate, means for transmitting said rate signal from said controller to said computer, and means including said computer responsive to the reception of said rate signal transmitting a second command to said drive to set the operational data rate of said drive at a data rate compatible with the data rate represented by said rate signal.

27. In a data processing system having a computer and a floppy controller and a multispeed peripheral record/playback device adapted to operate at any one of a predetermined plurality of different data rates and connected to said compute for recording data transmitted from said computer to said device and for transmitting data read by said device to said computer, means for controlling the speed and corresponding operational data rate of said device to provide data compatibility between said device and said controller, said last named means comprising:

means controlled by a signal received from said computer for operating said device to generate a series of index pulses, means for transmitting each generated index pulse to said controller, means for operating said controller to generate a series of n test pulses in response to the reception of a first index pulse of said series from said device, means including said computer for determining the data rate at which said controller is operating from the time required by said controller to generate said series of n test pulses, and means including said computer responsive to said determination for transmitting a single to said device for setting the operational speed and data rate of said device to a speed and data rate compatible with the data rate at which said controller is operating.

28. The system of claim 27 in combination with:

means controlled by said computer for transmitting coded messages with said controller to said device to effect different operational functions of said device with each function being associated with a unique message, means for sending a confirmation signal back to said controller as each bit of a message is received by said device, and means for sending a coded reply message to said controller in response to the reception of a coded message by said device.

* * * * *